United States Patent Office 2,902,393
Patented Sept. 1, 1959

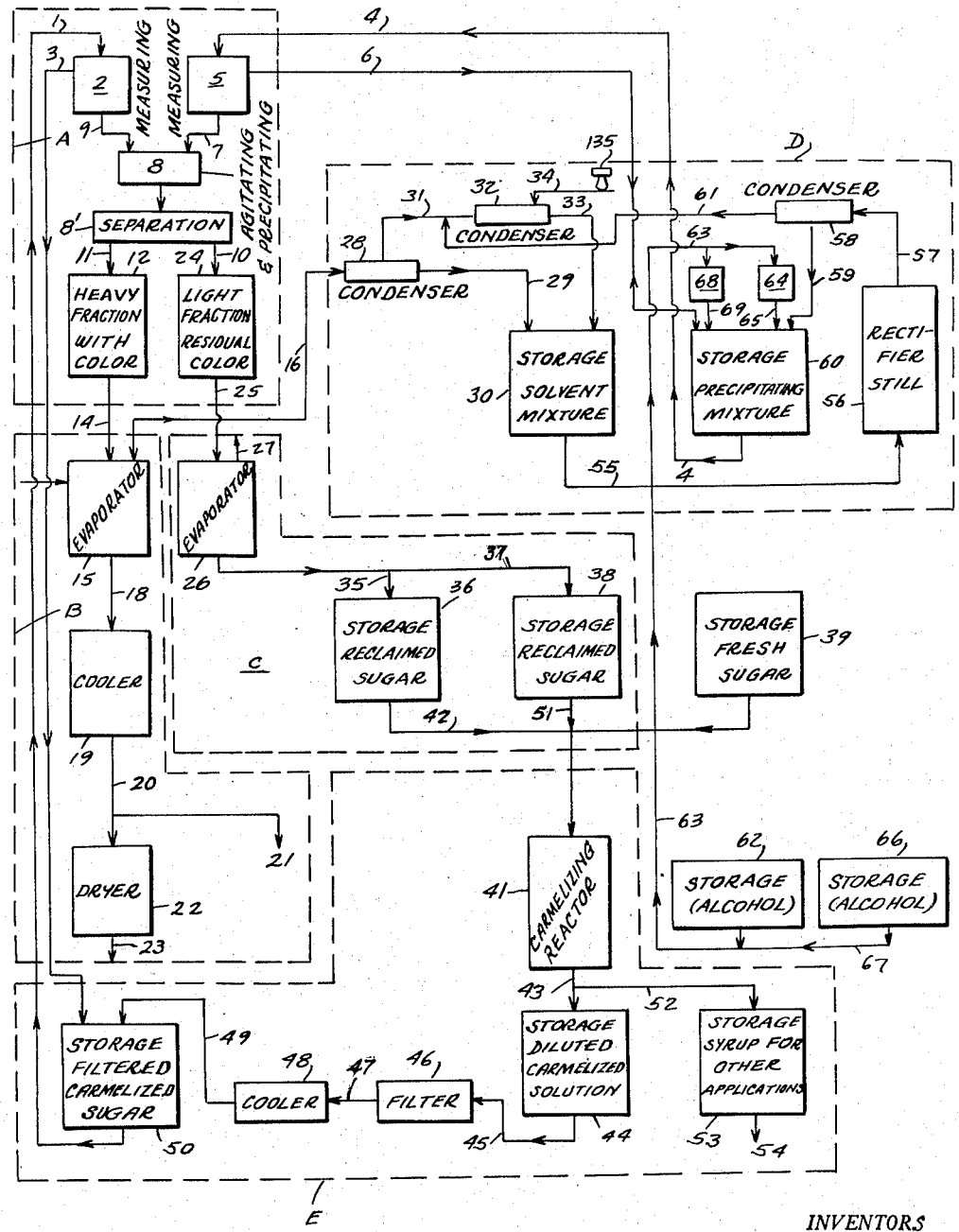

2,902,393
ISOLATING CARAMEL COLORING COMPOUNDS FROM CARAMELIZED SUGARS

Alvin LeRoy Meyer and James E. Cleland, Granite City, Ill., assignors to Union Starch & Refining Company, Columbus, Ind., a corporation of Indiana Application June 25, 1956, Serial No. 593,488

5 Claims. (Cl. 127—34)

This invention relates to a process and apparatus for the isolation of the coloring compounds from caramelized sugars.

In general the method disclosed takes advantage of the fact that commercial caramel color owes its coloring power to the colloidal phase of the mixture of compounds present. The usual acid proof types, for instance, widely used in carbonated beverages, etc., ordinarily consist of about 70% solids and 30% of water. Of the total solids present only about 25% are color bodies or compounds having high tinctorial power and the remainder of the solids, with the exception of minor quantities of ash, etc., are sugars or intermediate products modified to a greater or less extent by the burning procedure or other processing applied.

The approximately 25% of the solids that provide the coloring power of commercial caramel color are in the colloidal state and dispersed in a medium of sugar syrup. It constitutes a very stable lyophilic colloidal system and most of the tests devised to evaluate caramel colors have the objective of comparing this stability under unfavorable conditions. Hence the various acid boiling, tannin, alcohol, compatibility tests, etc.

One phase of this invention is based on the discovery that the properties of caramel color bodies can be interpreted in terms of colloidal chemistry. Thus these color bodies are lyophilic or hydrophilic colloids with definite isoelectric points, are denaturable (reversibly or irreversibly), are precipitatable, etc., as will be more fully explained below.

In general there are three important types of caramel color on the market today and they are best differentiated by consideration of some of their colloidal characteristics, as follows:

(1) The most important variety in terms of volume, is the so-called "acid proof" type, very widely used in carbonated beverages. It has relatively weak electrical properties but is of a very definite and consistent character. The isoelectric point is in the very low range and may be around pH 0.3; at any rate it is below pH 3.2. As the pH is raised above 3.2 the colloidal system exhibits increasingly electronegative characteristics up to about pH 7.0. Some of these "acid proof" caramel colors are extremely stable and have phenomenal resistance to relatively strong acid concentrations before any denaturation or coagulation becomes evident. They are very stable in the presence of tannins or other negatively charged colloidal substances as would be predicted from their electronegative character. In addition they are likely to exhibit high resistance to aging or colloidal changes induced by time.

(2) Another well known commercial type may be characterized by a high isoelectric point at around 7.0 pH. This variety exhibits pronounced electropositive characteristics down to relatively low pH ranges. The variety is not as stable in the acid tests as type No. 1 above but is, of course, much more stable in the presence of electropositive colloidal substances such as those encountered in beers, etc. Hence this type of caramel color is sometimes known as brewer's color. Relatively smaller volumes of this variety are manufactured in the United States as the major users of caramel color in this country are the carbonated beverage manufacturers.

(3) There is a type of caramel color having electropositive colloidal characteristics that is manufactured in large quantities and is sometimes referred to as baker's and confectioner's caramel color. The isoelectric point is somewhat higher than that of type No. 1 and is likely to fall between 3.0 and 4.0 pH. This variety is very stable in the acid boiling tests but will haze up immediately in the presence of negative colloidal substances like tannins and eventually throw down a heavy precipitate. It can be made satisfactorily in conventional burning processes with 20 to 30% greater tinctorial power than the "acid proof" or beverage type described under No. 1. It is less resistant to development of instability with age, however, and in this way resembles type 2 (brewer's) more than type 1. It is inclined to be much more viscous than the latter at the same gravity.

All of these types have modifications or subgroups in the form of specialties but they can be classified under the above general headings on the basis of colloidal characteristics.

It is obvious that a caramel color having electronegative colloidal characteristics (such as type 1, "acid proof" or "beverage type") should never be mixed with one having electropositive character such as types 2 and 3 ("brewer's" and "baker's"). If such types are mixed, they will neutralize the charges prevailing in each other and a portion of the colloidal content of each system will become unstable and eventually precipitate. This is why certain types of caramel color are referred to as "incompatible."

We have found that the colloidal system of caramel color is lyophilic in nature and tend to resemble starch gels, gelatin and certain proteins in many of their colloidal aspects. The caramel colors have well defined isoelectric points, for instance, but no great loss of stability is suffered by the colloidal phase when that point is reached. The addition of electrolytes has only a slight influence on stability.

The most effective means of rendering the colloidal phase unstable and causing reversible coagulation and precipitation of the color bodies is by the addition of water-soluble alcohols and similar hydrophilic liquids as disclosed in Patent No. 2,533,221, for example. The reason such alcohols act to precipitate the color bodies is apparently because they bring about a dehydration of the colloidal particles and cause them to coagulate and settle in a well defined layer easily separable from the sugar syrup. After the separation of the colloidal and crystalloidal constituents has been made, i.e. the color bodies from the sugars, and the alcohol removed from the color bodies it is found that the colloidal fraction can be repeptized very readily in water to again produce a very stable system. In other words it is a reversible system we are working with and the sugar syrup dispersing medium can be replaced with water without impairing the colloidal stability. In this manner the coloring ability or "tinctorial power" of the separated solids (color bodies) can be built up to four or more times that of the original caramel color solids as will be readily apparent when it is understood that most of the uncaramelized sugar has been removed from the mixture and virtually pure color compounds are isolated by our process.

A major objective of the present invention is to provide a novel and economical continuous process of producing caramel colors by the method of alcoholic separation of the colloidal phase followed by repeptization of this in the form of a stable aqueous solution, or a readily dispersible dry powder, both of uniquely high tinctorial power.

Another objective of this invention is to provide suitable equipment in proper arrangement to accomplish the other objectives of this invention in the most practical and economical manner.

Another objective of this invention is to provide a process suited to the equipment and methods disclosed for the purpose of separating the essential constituents (color bodies) of caramel color from the residual sugars and also to provide for the economical handling of the latter in a recycling operation so as to utilize essentially all of the sugar for production of color.

Another objective of this invention is to provide practical means of handling and recovering the alcohols or other solvents employed.

Another objective of this invention is to produce liquid or dry caramel color in which the solids are essentially unadulterated color bodies well suited to all of the uses to which caramel color is presently put but of hitherto unattainable coloring power.

Another objective of this invention is to provide a process for recaramelizing the residual sugar recovered from the separation steps and to produce additional high quality coloring compounds from it until all of the sugar is used up in an efficient manner and with maximum yields of color.

Another objective of this invention is to provide a recycling process that will hold to a minimum the quantity of residual sugar not acceptable for reburning into the type of color being made.

Another objective of this invention is to provide a method of catalyst control and processing to produce color from the reclaimed sugar that will be equal in quality to that produced from new sugar.

Other and further objectives of the invention will be obvious upon examination of the illustrations disclosed herein and various advantages will become apparent to one skilled in the art when the methods of the invention are employed in practice.

Another phase of this invention is based on the discovery that in order to effectively reutilize the residual sugar recovered from the caramel color solution after separation of the color bodies, the increase in impurities including the ash content of the recovery product must be kept under control. When the impurities (including the ash) in the sugar reaches a certain level the colloidal properties of the caramel are affected by said impurities or ash in a way which is quite unpredictable so that ordinarily the acid resistance and similar properties of the color produced is inferior.

The objects of this invention are attained by separating caramel color bodies from an acid proof type caramel color syrup, recovering the uncaramelized sugars and recaramelizing the latter under such conditions that the impurity and ash content of the sugar does not exceed a certain level. After the ash content of the syrup has reached a certain value which prevents the obtaining of good acid proof color bodies therefrom, the ash can be removed as by ion-exchange methods or the syrup can be utilized to produce a different type of caramel color (the "brewer's" or "baker's" type described above, for example).

In the precipitation the bulk of the impurities and the ash content of the original caramel color syrup remain with the dissolved portion so that the ash and other impurities are simultaneously built up. A convenient method of measuring the total content of impurities is to measure the ash content. It has been found that it is not possible to produce satisfactory acid proof caramel color from the reclaimed sugar syrup when the ash content is increased to over 11% (based on the weight of the sugar present). A considerable portion of the ash content may be due to the catalysts added during the caramelization step. Another deterrent to the production of good acid stable color is the presence of over polymerized sugar. The nature of all the reactions which together produce the color bodies is not known but one reaction is a polymerization of the sugar bodies wherein the crystalloidal sugar molecules are polymerized to approximate colloidal dimensions. However this polymerization must not be carried too far and the presence of too many highly polymerized molecules tends to produce a color of decreased acid stability.

According to a preferred modification of this invention the excessive build-up of both ash and excessively polymerized molecules in the reclaimed syrup is prevented by adding fresh make-up sugar to the reclaimed, the amount of make up sugar being approximately equal to the amount of sugar taken out as color and lost during the process. The combined syrup is then caramelized and less catalyst is required thus preventing the excessive build-up of ash due to the catalyst, but even so it was surprising to find that the reclaimed sugar can be recycled a much larger number of times and the ash content can be allowed to increase up to 11.0% before the acid instability of the color product becomes apparent. One explanation of this phenomenon may be that the fresh make-up sugar (which is preferably pretreated to polymerize it) may act to prevent excessive polymerization of the reclaimed sugar.

Whether make-up sugar is added or not, it is necessary to concentrate the reclaimed sugar to a gravity of 44–47° Bé. before recaramelizing the product in order to produce the acid proof product of the invention in the ultimate degree.

There are, of course, a great many possible ways of handling reclaimed or residual sugar in the reburning operation. A number of these are practical to a greater or less degree but we have found that certain methods of handling or reburning schedules are much more economical and lend themselves better to a continuous, smoothly operating process. These are the preferred methods disclosed in the following illustrations but are not to be construed as limiting the invention except as delineated in the appended claims.

One method of handling the reclaimed sugar is merely to strip the alcohols, etc. from it and concentrate to about 45° Bé. and reburn by standard procedure chosen. This method has been explored through a considerable number of cycles and data are tabulated below to illustrate results, as follows:

TABLE 1

| Caramelization Separation Cycle | Lbs., 45° Bé. Sugar Remaining | Percent of Sugar Used in Cycle | Lbs., 37.8° Bé. Caramel Produced | Lbs. D.S. Color Bodies Separated | Percent Ash D.S.B. on Caramel |
|---|---|---|---|---|---|
| 1 (Sugar) | 100 | | 112.35 | 20.71 | 2.70 |
| 2 | 67.72 | 32.3 | 77.93 | 14.28 | 4.24 |
| 3 | 47.07 | 30.5 | 55.13 | 11.04 | 4.62 |
| 4 | 32.22 | 31.5 | 38.52 | 8.01 | 5.70 |
| 5 | 22.17 | 29.8 | 26.06 | 4.92 | 6.57 |
| | 15.57 | | | | |
| Totals | 284.75 | | 309.99 | 58.96 | |

It will be noted that each burning cycle uses up only about 30% of the sugar so it is necessary to recirculate the original sugar several times or until it is all converted to color so far as practical. Hence the starting sugar was only 100 lbs. but the recirculation system handled 284.75 lbs. The same situation is evident in respect to the caramel produced. Recirculation accounts for the poundage sent through. The final yield of products from the 100 lbs. of raw material was 58.96 lbs. color bodies and 15.57 lbs. residual sugar.

It will be noted that the material started with in this case was a commercial caramel color of the "acid proof" or "beverage" type. The color was separated by dehydration-precipitation of the colloidal phase with alcoholic mixture. Then the residual sugar was stripped of volatiles, concentrated and reburned to produce caramel color by the same procedure but with catalyst adjusted to quantity used. This operation was repeated five times and it will be observed that the quantity of sugar available for reburn decreased each time because of color removal and shrinkage inherent in the operation.

The four lots of color produced were subjected to some of the standard tests [1] designed to evaluate colloidal stability and the following results were obtained:

TABLE 1A

| T.P.[2] Finished Color | 5 Minute Acid Boil Test | Acid Tannin Test | Neutral Tannin Test |
|---|---|---|---|
| 2. 26.0 | A | A | A |
| 3. 24.0 | A | A | A |
| 4. 26.0 | A | A | A |
| 5. 23.0 | C | A | A |

[1] For details of tests see Ind. and Eng. Chem., vol. 10, p. 349.
[2] Tinctorial power.

Tests on each lot were satisfactory up to lot No. 5 when a "C" value (slight precipitation) was obtained in the acid boil test. Later runs however, demonstrated that satisfactory acid proof color could be made in this cycle and succeeding ones by manipulation of the catalysts and burning procedure. The method, however, suffers from three obvious faults, as follows:

(1) The ash and other undesirable impurities tend to accumulate in the reclaimed sugar and begin to reach an impractical level about the fifth cycle. This ash can be removed by ion exchange methods but the step is costly.

(2) The quantity of sugar available diminishes each time and requires variation in the process with each burn or combination with other residues to make up a full batch.

(3) Polymerization may proceed too far with a tendency to instability. Nevertheless, acceptable caramel color, consisting of isolated color bodies, can be made by this method and it is not desired to exclude it from the scope of this invention. If it is desirable to stop reclaiming sugar after the fifth burn with the objective of reburning to acid proof color it is obvious that a different grade, tolerating a higher ash, can be made and diverted into other channels if market conditions are flexible enough to handle such grades. The residual sugar may be diverted to other uses and may not constitute more than 20% of the solids originally present in the first burn or starting quantity of caramel color.

A logical development of this system might be a method of blending residual sugar from several lots after the first and subsequent separations and reburning this mixture. This system can be set up to provide a uniform quantity of sugar for each reburn but results in a complex schedule and requires excessive storage space. An acceptable product can be made in this manner but the system suffers from the same limitations noted in the first illustration above. The build-up in ash and other impurities is rapid.

We have found that the most efficient and satisfactory method of operation is to replace the solids used in color production and processing shrinkage with fresh sugar before each reburning step. In this manner the batch size is maintained and the ash accumulation is held in abeyance for many additional cycles. In the preferred embodiment of this invention the fresh sugar is polymerized before it is blended with the recovered sugar. This polymerization may be accomplished by a method of acid reversion described in Patent No. 2,582,261 of Longenecker. According to this patent sugar solutions to be caramelized are first preheated at a pH of 0.2 to 4.0 to polymerize the sugar.

Different proportions of polymerized fresh sugar and reclaimed sugar can be employed as shown by the following results:

A batch consisting of 75 pounds of polymerized sugar and 25 pounds of reclaimed sugar is caramelized in the conventional manner using (A) 0.95 pound of ammonia, (B) 0.73 pound of ammonium sulfate, and (C) 2.47 pounds of a sulfite bearing chemical. Caramelization is carried on at 275° F. until the desired color is reached, usually 22 to 24 tinctorial power units. The same process is followed with different proportions of fresh and reclaimed sugar as shown in Table II.

TABLE II

| Exp. No. | Polymerized Sugar | Reclaimed Sugar | Catalyst A | Catalyst B | Catalyst C | Temp., °F. |
|---|---|---|---|---|---|---|
| 1 | 75 | 25 | 0.95 | 0.73 | 2.47 | 275 |
| 2 | 25 | 75 | 0.59 | 0.91 | 1.82 | 275 |
| 3 | 50 | 50 | 0.73 | 1.01 | 2.15 | 275 |

Results of standard tests on these burns were as follows:

| Exp. No. | Baumé Finished Color | 5 Minute Acid Boil Test | Acid Tannin Test | Neutral Tannin Test | T.P. of Prod. |
|---|---|---|---|---|---|
| 1 | 37.8 | A | A | A | 22.0 |
| 2 | 39.8 | A | A | A | 25.0 |
| 3 | 373 | A | A | A | 27.0 |

The stability tests show that a blend of reclaimed sugar and polymerized fresh sugar can be satisfactorily caramelized in any proportions to yield a caramel color of high quality when the reclaimed sugar used is recovered from the first separation as in the above example. This would not necessarily hold if all the reclaimed sugar used came from a later burn, for instance the 6th or 7th in a series like that illustrated in Table I, and constituted a large percentage of the make-up. In all probability the ash content would be relatively high under such conditions unless special precautions had been exercised to minimize it.

It was found, however, that quality could be maintained and a standard procedure set up if the sugar make-up for each burn-separation step, after the first, was composed of the reclaimed sugar from the preceding separation plus enough fresh sugar to replace the color bodies (colloidal phase) removed, chemical losses and processing losses. In this manner the volume of the batches could be maintained through all cycles and appreciable deterioration in quality of the recovered color could be held in abeyance much longer or through a greater number of recaramelization and separation steps.

Although as set forth the caramelization process of Patent No. 2,582,261 is a preferred process especially for the production of acid-proof caramel color, other caramelization processes may be employed. An important phase of the present invention is primarily concerned with the broad continuous process and apparatus for the caramelizing of carbohydrate syrups, separation of caramel color from uncaramelized sugars and the recycling of the latter.

The following table is an example of the operation of the process in accordance with this principle.

TABLE III

| Cycle No. | Percent Polymerized Corn Sugar | Percent Reclaimed Sugar | Sugar Bé. of Blend | Method of Caramelization | Heating Temp. °F. | Baumé Finished Product | T.P. Finished Caramel | 5 Min. Acid Test | 10 Min. Acid Test | Neut. Tannin Test | Acid Tannin Test | Pure Color, Percent Yield |
|---|---|---|---|---|---|---|---|---|---|---|---|---|
| 1 | 100 | 0 | 45.0 | Longenecker Pat. 2,582,261. | 275 | 37.8 | 23.0 | A | A | A | A | 25.0 |
| 2 | 37.3 | 62.7 | 45.0 | ----do---- | 275 | 37.85 | 27.5 | A | -------- | A | A | 30.5 |
| 3 | 38.6 | 61.4 | 45.0 | ----do---- | 275 | 38.2 | 28.0 | A | -------- | A | A | 29.7 |
| 4 | 37.9 | 62.1 | 45.0 | ----do---- | 275 | 38.35 | 26.0 | A | -------- | A | A | 24.7 |
| 5 | 32.2 | 67.8 | 45.0 | ----do---- | 275 | 38.0 | 27.0 | A | -------- | A | A | 29.1 |
| 6 | 37.3 | 62.7 | 45.0 | ----do---- | 275 | 37.6 | 23.5 | A | A | A | A | 23.6 |
| 7 | 33.6 | 66.4 | 45.0 | ----do---- | 275 | 38.35 | 25.5 | A | A | A | A | 23.4 |
| 8 | 27.4 | 72.6 | 45.0 | ----do---- | 275 | 38.6 | 24.5 | A | A | A | A | 25.2 |
| 9 | 35.0 | 65.0 | 45.0 | ----do---- | 275 | 37.8 | 25.0 | A | A | A | A | 26.0 |
| 10 | 34.2 | 65.8 | 45.0 | ----do---- | 275 | 37.95 | 26.0 | A | A | A | A | 26.0 |
| 11 | 33.1 | 66.9 | 45.0 | ----do---- | 275 | 37.7 | 25.5 | A | A | A | A | 26.2 |
| 12 | 36.7 | 63.3 | 45.0 | ----do---- | 275 | 38.05 | 24.0 | A | A | A | A | 25.0 |
| 13 | 34.6 | 65.4 | 45.0 | ----do---- | 275 | 37.8 | 24.5 | A | A | A | A | 25.4 |
| 14 | 35.2 | 64.8 | 45.0 | ----do---- | 275 | 37.65 | 25.5 | A | A | A | A | 26.3 |
| 15 | 36.8 | 63.2 | 45.0 | ----do---- | 275 | 37.95 | 25.5 | A | A | A | A | 26.4 |
| 16 | 33.6 | 66.4 | 45.0 | ----do---- | 275 | 38.1 | 24.5 | A | A | A | A | 25.7 |
| 17 | 34.7 | 65.3 | 45.0 | ----do---- | 275 | 38.1 | 23.5 | A | A | A | A | 25.0 |
| 18 | 36.2 | 63.8 | 45.0 | ----do---- | 275 | 37.75 | 25.5 | A | A | A | A | 26.1 |
| 19 | 34.9 | 65.1 | 45.0 | ----do---- | 275 | 37.95 | 26.0 | A | A | A | A | 26.9 |
| 20 | 34.3 | 65.7 | 45.0 | ----do---- | 275 | 37.8 | 25.0 | A | A | A | A | 25.7 |
| 21 | 36.7 | 63.3 | 45.0 | ----do---- | 275 | 37.8 | 25.0 | A | A | A | A | 25.9 |
| 22 | 35.3 | 64.7 | 45.0 | ----do---- | 275 | 37.95 | 25.5 | A | A | A | A | 26.3 |
| 23 | 35.2 | 64.8 | 45.0 | ----do---- | 275 | 37.85 | 26.0 | A | A | A | A | 26.7 |
| 24 | 33.6 | 66.4 | 45.0 | ----do---- | 275 | 37.8 | 24.5 | A | A | A | A | 25.3 |

In a typical series of runs as outlined in Table III polymerized corn sugar of 45° Bé., such as prepared by the process set forth in U.S. Patent No. 2,582,261 is the starting material. This polymerized corn sugar is employed as make-up sugar as well as the starting material. The product is heated to 275° F. until a tinctorial power of 23.0 (Lovibond units) is obtained. The viscosity of the finished product is decreased during caramelization to approximately 38° Bé. The color is precipitated by a mixture of methanol and isopropanol and a 25% yield is obtained.

The residual sugar was reclaimed and amounted to approximately 63% of the original corn sugar (by weight) so that 37% of fresh make up sugar is added and the blend is concentrated to 45° Bé. To this solution, make up catalysts are added (in addition to the catalysts which are already present from the reclaimed portion of the blend). The caramelizing process is repeated as in the original run.

In the same way 22 additional runs were made and in each case the reclaimed sugar employed was from 60–73% of the blend and the added make up sugar of course varied from 40–27% of the blend. Comparable additions of catalysts were employed. In each case the blend was concentrated to 45° Bé. and the caramelizing temperature was 275° F. The yields of coloring compounds varied from 23–40% and in each case the color bodies obtained passed the (1) 5 minute acid test, (2) the 10 minute acid test, (3) the neutral tannin test and the acid tannin test, each with a rating of A.

The residual sugar left after the 24th run may be made into baker's and brewer's color by any known process. A very satisfactory process is that disclosed in copending application Serial No. 280,198, filed April 2, 1952. According to this process the syrup is pretreated by adding 0.1–5% of an alkaline reagent and heating to 150–250° F. for ¼ to two hours. The syrup is then acidified back to a pH of 2–5 and caramelized at 320–380° F. without adding any additional catalysts.

In the drawing:

The single figure is a diagram on the order of a flow sheet illustrating successive steps and the combination of apparatus made according to the invention.

The apparatus may be divided broadly into a precipitating section A (enclosed in dotted lines); a color purifying section B; a residual sugar recovery section C; a solvent recovery section D; and a caramelizing section E. Boxes 62 and 66 not included in any of these sections are merely alcohol or precipitant storage tanks.

A. Precipitation and decantation

Caramel color of any commercial grade but preferably of a very stable variety, and having a Baumé of 36–40° flows through line 1 into measuring tank 2 which measures the exact volume for a batch by discharging any excess through line 3. Tank 2 is equipped with an agitator and a coil which can be used to heat or cool the caramel coloring in order to achieve a desired operating temperature which may be in the range of 40 to 80° F.

An alcoholic mixture, which may consist, for instance, of methanol and isopropyl alcohol in a ratio of approximately 4 to 1 and sp. gr. 0.84 to 0.86, corrected to 80° F., flows from storage through line 4 into measuring tank 5. This tank is equipped with an overflow line 6 so the quantity of alcoholic mixture can be accurately controlled. The alcoholic mixture leaves tank 5 through line 7 and enters tank 8.

When the measured quantity of alcoholic mixture is in tank 8, caramel color is allowed to flow through line 9 into tank 8, i.e., into the alcoholic mixture. This is a relatively slow addition through a perforated baffle or dispersing plate located in the top of tank 8, which distributes the caramel evenly over the surface of the precipitant. The dispersing plate contains a plurality of ⅛ inch slots, for example. The caramel is introduced into the center of the plate and flows outwardly toward the edges. Whatever caramel does not pass through the slots falls over the edge of the plate. Tank 8 is equipped with an agitator and vigorous mixing is applied during the period of the introduction of the caramel color and for about one minute thereafter. The agitator is then stopped and the mixture of caramel color and dehydrating or precipitating agent is allowed to stand quietly for about 15 minutes. The colloidal or disperse phase, i.e. the color bodies, of the caramel color begin to coagulate as soon as the agitation is stopped and rapidly settle to the bottom in a denatured or flocculated condition. The heavier fraction containing the color bodies may be separated from the lighter fraction by gravity decantation, for example, or by a centrifugal separator as shown at 8'. The lighter fraction comprises about 90% of the total volume, is free flowing and contains most of the uncaramelized sugars. The remaining 10% contains almost all of the color bodies and is relatively viscous. The specific gravity of the lighter fraction for example is approximately 0.98–0.99 and of the heavier fraction is approximately 1.18 to 1.20.

(B) Treatment of color containing portion

After separating the lighter fraction or about 90% of the volume, containing the bulk of the uncaramelized sugars, from the heavier fraction, the latter containing most of the color bodies (formerly the disperse phase in the original color) is dropped into tank 12 through line 11. Water may be employed to help feed the heavier fraction to tank 12 since water is eventually to be added to the fraction in this tank anyway. Water in proportions of 55 to 120 gallons parts per 100 gallons of the heavier fraction is added to the latter in tank 12; 55 parts of water is very satisfactory.

The color fraction or heavier fraction, diluted with 55 parts of water, is then passed through line 14 into evaporator 15 where the alcoholic distillate is removed through line 16 and recovered for use in the next cycle. The addition of water is necessary in order to assure the complete elimination of the alcohol precipitants which may be undesirable depending on the alcohols employed in precipitating. If water is not added the temperature required to complete the elimination of the alcohols would permanently denature the colloidal bodies. It should be noted here that the solution of color bodies from which the alcoholic mixture has been stripped will support mold and yeast growth quite well and precautions should be taken to protect the solution against this possibility. If the fraction is reduced to solids immediately, by spray drying or other means, there is, of course, no danger of spoilage if the dry powder is reasonably protected from atmospheric moisture. The high color solids recovered are much less hygroscopic than the original sugar or the solids recovered by merely drying any variety of commercial caramel color.

If the color bodies are to be stored in liquid form for periods beyond 24 hours it is advisable to add a preservative. A practical concentrate containing as high as 50% solids can be made by evaporation of the solution of color bodies dissolved in a liquid such as water or propylene glycol and this is a useful product as the tinctorial power is at least double that of any unfractionated caramel color available in commercial channels. If an attempt is made to concentrate the aqueous solution of color bodies much above 50% solids the viscosity rises very rapidly and the product is difficult to handle in liquid form. In concentrations around 45% solids the aqueous solution is a very fluid and stable liquid of great coloring power as the colloidal state of dispersion is readily restored by simply redispersing in water after the alcoholic denaturing or dehydrating agent has been removed. The resulting colloidal system has the same hydrophilic character as in the original caramel color and electrical properties are very similar. In other words an electronegative or positive colloidal character in the original caramel color will persist in the recovered, isolated color bodies when redispersed in water, demonstrating complete reversibility. This is one of the essential scientific phenomena on which this invention rests and it appears to have been hitherto overlooked that the colloidal system of caramel color can be made so as to be reversible. No irreparable damage is done to the stability of the caramel color bodies by the methods of this invention.

Sodium benzoate is a satisfactory preservative for the color bodies when redispersed in water. About 0.1% was found to give adequate protection if added when the liquid issued warm from the still.

The evaporator 15 should operate under vacuum of at least 26" at all times and continuous evaporation is preferable. If practiced on a batch basis the concentration step should not require more than 2 hours of boiling at 26" vacuum (temp. 150° F.) as the disperse phase (color) is heat sensitive and may be denatured in an irreversible manner so as to not redisperse satisfactorily.

The product can also be dehydrated by the freezing and thawing methods.

The redispersed and concentrated color bodies, from which the denaturing alcoholic mixture has been stripped and recovered, leave the evaporator 15 through a line 18 and go to a cooler 19 where the product is cooled to below 100° F. The liquid product may be drawn from the cooler 19 through a line 20 and can be packed in suitable containers from a line 21 as a liquid product or it can be dried to a powder in a spray drier 22 and packed as a dry product from an outlet 23.

(C and D) Treatment of sugar containing portion and alcohol recovery

The layer of lower specific gravity which constitutes approximately 90% of the volume after separation at 8, is drawn through a line 10 and enters a storage tank 24. This material, referred to as the mother liquor, and containing almost all of the uncaramelized sugars is moved through a line 25 to an evaporator 26. The alcoholic mixture associated with this fraction is stripped from the mother liquor, the vapors thereof passing from the evaporator 26 thru line 27 and entering a line 16 which also carries vapors from the evaporator 15. These combined vapors enter a water cooled condenser 28, are at least partially condensed, and the resultant solvent passes to a line 29, whence it flows to a holding tank 30. The water cooled condenser 28 is vented thru the line 31 to a salt brine condenser 32 which condenses residual vapors and returns them thru a line 33 to the tank 30. The salt brine condenser 32 is in turn evacuated, at point 34, by a steam jet air ejector 135. This jet produces the vacuum requirements for the entire system of evaporators.

The residue in evaporator 26 is concentrated until a Baumé reading of 43–45 is obtained. This recovered residue is essentially sugar and is used to make more caramel color. The concentrated sugar solution, free of alcoholic mixture, may be drawn thru a line 35 into a tank 36. The concentrated sugar remaining after a predetermined number of cycles (such as 24, for instance, as in this illustration of the process) may be drawn thu a line 37 into a tank 38 where it is stored until a sufficient quantity has accumulated to make it desirable to route it to burners equipped to make a less critical type of caramel color than the one dealt with in this illustration. This residual accumulation purged from the system, after many cycles, may, for instance, be burned to produce baker's and confectioner's color in which high tinctorial power is of primary importance but where fluidity, acid stability and shelf life are of secondary importance. It is desirable to hold the sugars in both tanks 36 and 38 at about 130° F. so they may be handled and flow readily. Hence these tanks are equipped with heating coils.

(E) Caramelizing step

Fresh corn sugar of about 45–46° Baumé and 70 to 90 dextrose equivalent is drawn from a heated storage tank 39 thru a line 40 into a closed reaction kettle 41 where it may be polymerized to a dextrose equivalent of 40 to 50 by heat treatment at a pH of 1.0 to 2.0 or in any manner giving equivalent results. Any sugar or mixture of sugars capable of producing a satisfactory commercial color may be used at this stage for make-up but we prefer the sugar above described and treated as disclosed. After polymerization to 40–50 dextrose equivalent has been completed in the reaction ketle (steam jacketed), the pH of the liquor is increased to the value which stops the polymerization reaction as by addition of ammonia, for example. Residual recovered sugar from the tank 36 is then drawn thru a line 42 and flows into the reaction kettle 41 where caramelization of the mixture is accomplished by heating to about 275° F. until the required tinctorial power is developed. The quantities of polymerized fresh sugar, reclaimed sugar, catalysts, etc., are regulated according to the recaramelization conditions desired.

Caramel color produced in the reaction kettle 41 is drawn thru a line 43 into a tank 44 after dilution with water to 36–38° Baumé. The caramel color from the tank 44 flows thru a line 45 to a filter 46 where a small quantity of sediment is removed. The product is then drawn thru a line 47 to a cooler 48 where it is cooled to 80° F. From the cooler 48 the product goes thru a line 49 to a storage tank 50 from which it is routed back thru the line 1 and recycled thru the separation steps above described and the equipment numbered 1 thru 50.

The residual sugar in tank 38, i.e. the sugar recovered after many cycles and which it is desirable to purge from the system to a less critical use, is drawn thru a line 51 to a reaction kettle 41, which may be the same reaction kettle as that employed for the other caramelizing reactions, where a conventional caramelization may be carried out. The product is drawn thru a line 52 to a storage tank 53 and is packed from an outlet 54.

The alcohol-water mixture in tank 30 flows thrus a line 55 entering an alcohol recovery rectifier still 56. Alcohol vapors pass through a line 57 and are condensed in a water cooled condenser 58. The condensed vapors flow thru a line 59 to a tank which is the holding tank for the alcoholic mixture used as the denaturing agent in the color-sugar separation. Precautions are taken to assure that this alcohol mixture has been recovered and controlled at the specific gravity best adapted to color separation (about 0.84 to 0.86 in this illustration of the process) and it is routed thru line 4 from the tank 60. The alcohol recovery practiced in this process must be very efficient and economical to assure that economic aspects of the process are favorable. Losses should be not over 1% and to achieve this the best modern stills and rectifiers are required.

The vapors from condenser 58 enter the line 61 and this connects with the line 31. These vapors are recovered in the salt brine condenser 32.

Make-up alcohols are drawn into the system as follows:

(1) From a methyl alcohol storage tank 62, thru a line 63 to a measuring tank 64 and then thru a line 65 to a distillate storage tank 60.

(2) From an isopropyl alcohol storage tank 66 thru a line 67 and a line 63 to a measuring tank 68 and then thru a line 69 to distillate storage tank 60.

Aside from the many novel features of the process and procedure it has the outstanding ability of utilizing substantially all of the sugar for the purpose of making actual color whereas all conventional commercial processes now practiced for caramelization will utilize not more than 30% of the sugar and merely leave the balance, not consumed by chemical and process losses, in the dispersing phase of a colloidal system where it is useless and troublesome as it contributes nothing to stability and is so denatured as to have no sweetening ability but rather a disagreeable flavor associated with that of crude hydrol. This outstanding and novel ability of the process of the invention to conserve raw material should assure adoption of the method on a wide scale. The process can for instance reduce the consumption of sugars used for caramel color by 60 to 75% and it is obvious that this can be beneficial to countries having to import sugar for this purpose running into the millions of pounds.

It will be obvious to those skilled in the art that it is possible to make various changes in construction and arrangement of the equipment, changes in ratios of denaturing agents, sugars, etc., in the process and method of operation disclosed herein without departing from the spirit and scope of the invention and without sacrificing any of its advantages and it is, therefore, to be understood that the details taught are to be interpreted as illustrative and not to be construed as in a limiting sense.

This application is a continuation-in-part of serial No. 276,302, filed Mar. 13, 1952, and now abandoned.

We claim:

1. In a process for making pure caramel color compounds the steps comprising, caramelizing a sugar composition, precipitating the dispersed phase of color polymers from the composition by adding said composition to alcoholic dehydrating agents whereby a mixture consisting of two liquid phases is produced, a lighter phase containing substantially all of the uncaramelized sugars and a heavier phase containing almost all of the color bodies, separating the two liquid phases of said mixture into a lighter fraction and a heavier fraction by their density difference, redispersing the heavier fraction containing the denatured color bodies in water in the proportion of about 55 to 120 parts by volume of water to 100 parts by volume of said heavier fraction and evaporating residual alcohol from and concentrating the resultant dispersion under a vacuum at a temperature below 150° F.

2. In a process for making pure caramel color compounds the steps comprising, caramelizing a sugar composition precipitating the dispersed phase of color polymers from the composition by adding said composition to alcoholic dehydrating agents whereby a mixture consisting of two liquid phases is produced, a lighter phase comprising approximately 90% by volume of the total composition and containing substantially all of the uncaramelized sugars and a heavy phase comprising approximately 10% by volume of the total composition and containing substantially all of the color bodies, separating the two liquid phases of said mixture into a lighter fraction and a heavier fraction by their density difference, evaporating alcohol from the lighter fraction thereby obtaining a syrup containing uncaramelized sugar values, adding fresh make-up sugar to the reclaimed syrup of the lighter fraction in amount sufficient to replace the sugar which has been lost and converted to caramel color, recaramelizing the resultant syrup and repeating the color separation and syrup make-up steps a plurality of times.

3. In a process for making pure caramel color compounds the steps comprising, caramelizing a sugar composition to produce an acid-proof caramel color syrup having an isoelectric point at a pH of less than 3.2, precipitating the dispersed phase of color polymers from the composition by adding said composition to alcoholic dehydrating agents in sufficient proportions to produce a two phase mixture, centrifugally separating the phases of the resultant mixture to produce two fractions, a lighter fraction comprising approximately 90% by volume of the total composition and containing substantially all of the uncaramelized sugars and a heavy fraction comprising approximately 10% by volume of the total composition and containing substantially all of the color bodies, evaporating alcohol from the lighter fraction thereby obtaining a syrup containing uncaramelized sugar values, concentrating the said lighter fraction to a gravity of 44–47° Bé., recaramelizing the resultant syrup and repeating the color separation and concentrating steps until the reclaimed syrup has an ash content of approximately 11.0%, thereafter discharging said syrup from the system.

4. In a process for making pure caramel color compounds the steps comprising, caramelizing a sugar composition, precipitating the dispersed phase of color polymers from the composition by feeding an accurately measured precipitating proportion of alcoholic dehydrating liquid into a tank, introducing said caramelized sugar composition in the form of a multiplicity of fine streams into said tank while continually agitating the dehydrating liquid, discontinuing the agitation after a predetermined amount of said composition sufficient to produce a two phase mixture is added, separating the two phases of the resultant mixture to provide two fractions, a lighter fraction comprising approximately 90% by volume of the total composition and containing substantially all of the uncaramelized sugars and a heavy fraction comprising approximately 10% by volume of the total composition and containing substantially all of the color bodies, adding water to the heavy portion containing the precipitated caramel color bodies in proportion of from 5 to 120 parts of water to 100 parts of the heavy portion by volume, and evaporating residual alcohol from the resultant dispersion under a vacuum at a temperature below 150° F.

5. In a process for making pure caramel color compounds the steps comprising, caramelizing a sugar composition, precipitating the dispersed phase of color polymers from the composition by feeding an accurately measured precipitating proportion of alcoholic dehydrating liquid into a tank, introducing said caramelized sugar composition in the form of a multiplicity of fine streams into said tank while continually agitating the dehydrating liquid, discontinuing the agitation after a predetermined amount of said composition sufficient to produce a two phase mixture is added, centrifugally separating the two phases of the resultant mixture to provide two fractions, a lighter fraction comprising approximately 90% by volume of the total composition and containing substantially all of the uncaramelized sugars and a heavy fraction comprising approximately 10% by volume of the total composition and containing substantially all of the color bodies, evaporating alcohol from the lighter fraction thereby obtaining a syrup containing uncaramelized sugar values, adding make-up sugar to the reclaimed syrup in amount sufficient to replace the sugar which has been lost and converted to caramel color, recaramelizing the resultant syrup and repeating the color separation and syrup make-up steps a plurality of times.

References Cited in the file of this patent

UNITED STATES PATENTS

| | | |
|---|---|---|
| 2,533,221 | Cleland | Dec. 12, 1950 |
| 2,637,655 | Cleland | May 5, 1953 |